Figure 3:
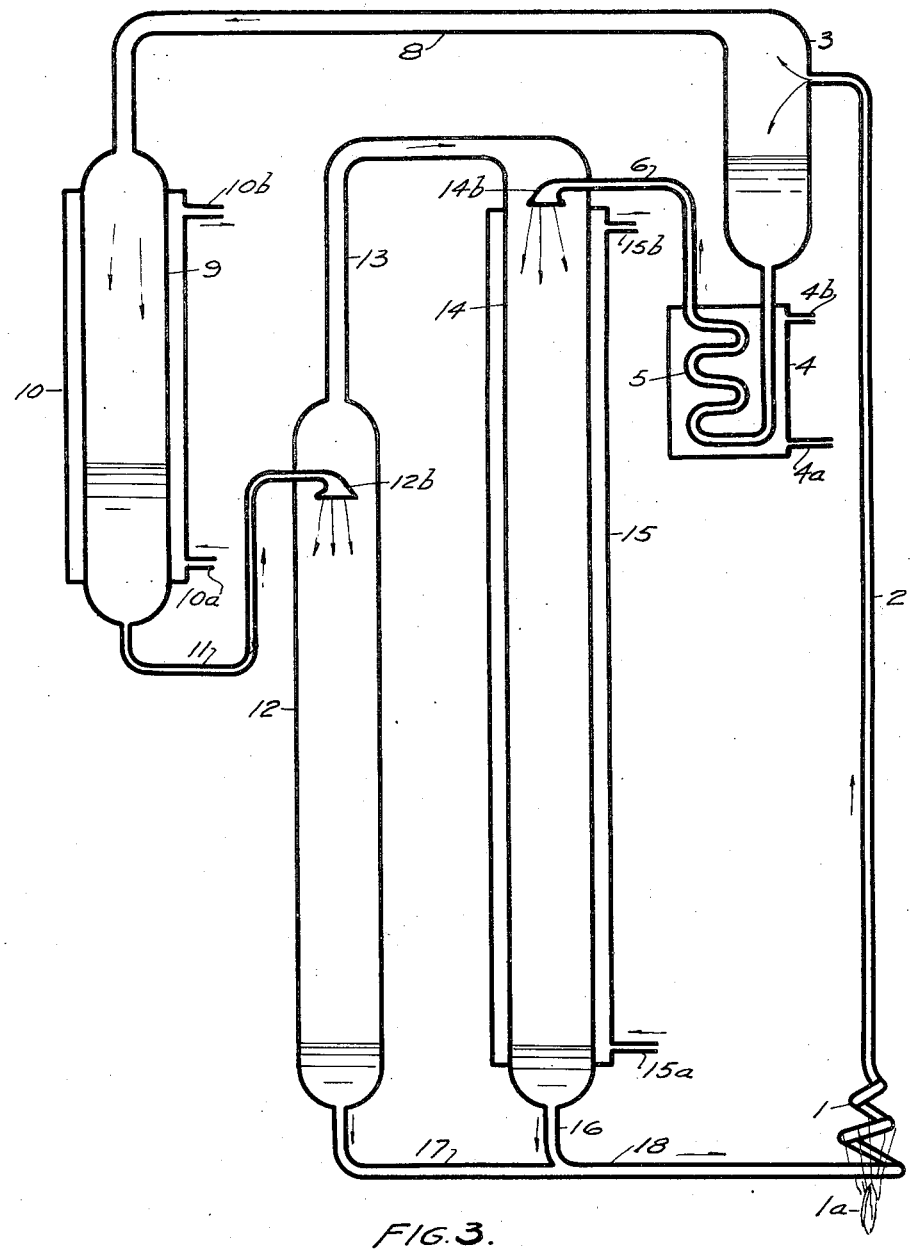

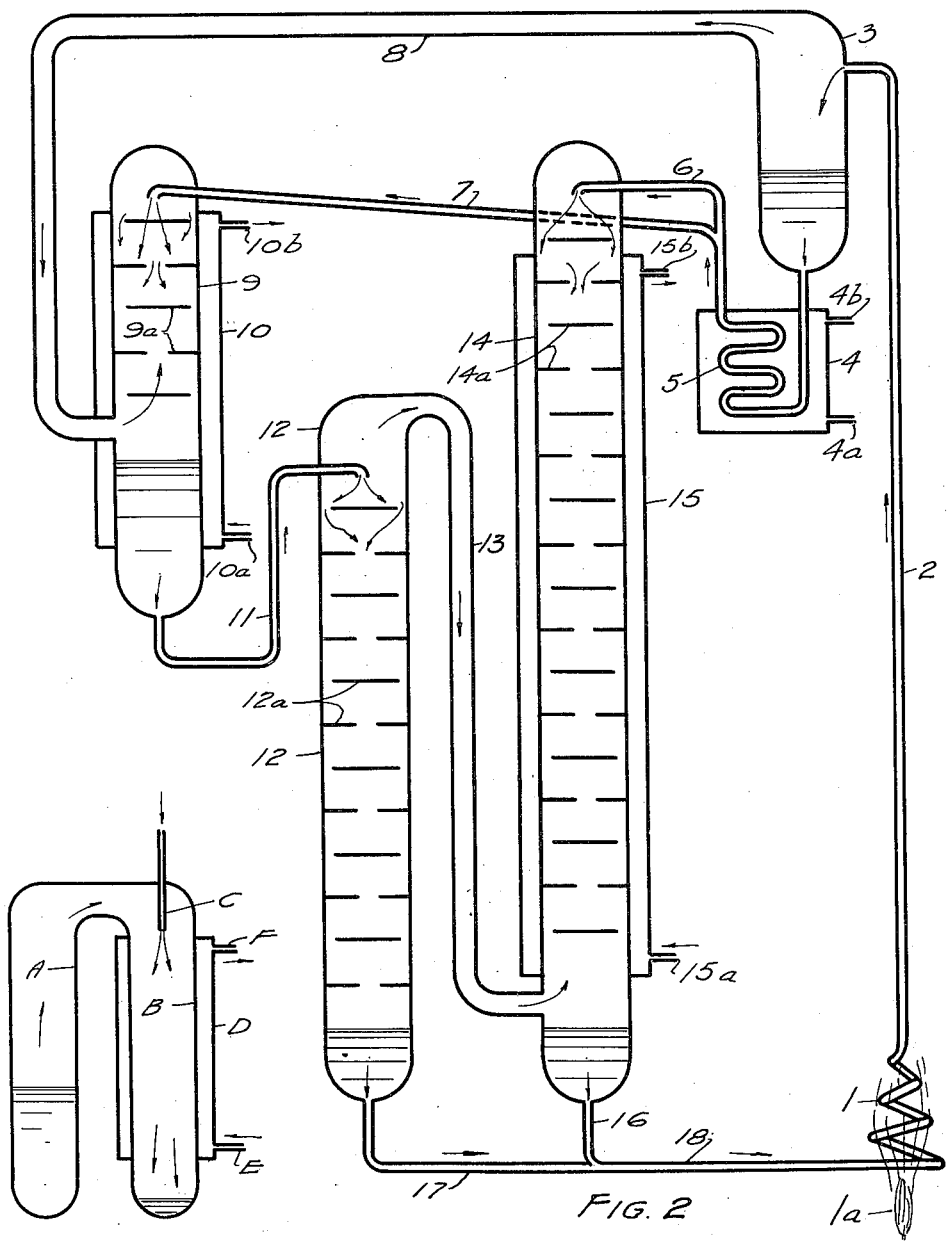

Patented Oct. 11, 1932

1,882,253

UNITED STATES PATENT OFFICE

BO FOLKE RANDEL, OF SAN DIEGO, CALIFORNIA

MEANS AND METHOD OF REFRIGERATION

Application filed April 29, 1930. Serial No. 448,276.

My invention relates to means and method of refrigeration and the object is to devise an absorption method and an apparatus suitable to carry out this method. The method is based upon the principle of absorption of a gas in a liquid and the accompanying generation of heat. According to this principle, during the absorption of a gas in a liquid, heat is generated, and this heat equals the heat absorbed during the separation of the said gas from the said liquid.

To apply the above principle, I connect two vessels, one which may be called an evaporator and another which may be called an absorber. In the absorber, I cause absorption of a gas in a liquid, and in the evaporator I cause separation from or evaporation of a gas out of a liquid. In the absorber, heat is generated, and in the evaporator heat is absorbed.

The accompanying drawings are purely diagrammatic and no attempts have been made to show apparatus in detail. Each part is conventional and may be constructed in many different ways.

Fig. 1 of the accompanying drawings further illustrate the principle upon which my invention is based. In this Fig. 1, A is the generator, partially filled with a concentrated solution of a gas absorbed in a liquid. Assume this solution to be ammonia in water.

Generator A connects with the absorber B. This absorber is surrounded by cooling jacket D, allowing for cooling water to enter at E and to discharge at F.

With a certain concentration of ammonia in water in the evaporator A, the space above the liquid surface, including the absorber, will be filled with ammonia vapor under a certain pressure, corresponding to the temperature. If now, through pipe C, a stream of water is permitted to enter the absorber B, the ammonia vapor present will be absorbed. The absorption of such vapor will cause a lowering of the vapor pressure in the evaporator, which in turn will cause evaporation of ammonia from the solution.

The absorption of ammonia in the absorber will generate heat, which is removed by the cooling water, and the evaporation of ammonia in the evaporator will absorb heat, the evaporator thus functioning as a means to produce refrigeration.

In Fig. 2, I illustrate in diagrammatic form an apparatus wherein the above principle is applied, the operation being continuous. The illustration is diagrammatic and the apparatus may be constructed in many different ways, the different parts being standard conventional articles now used in refrigerating apparatus of the absorption type. I include in my invention any and all arrangements of an apparatus wherein my method may be carried out. I include any and all means and methods to produce the necessary heat energy to operate my apparatus and any and all means and methods to produce cooling of such parts as require cooling.

In the illustration, 1 is the generator heated by flame 1a. If it is assumed that the mediums used are ammonia and water, and that the generator is filled with a rich solution, then by applying sufficient heat to the generator, the ammonia may be entirely, or nearly so, separated from the water.

The liberated ammonia vapor will pass upwards, carrying the water along through pipe 2, vapor and liquid discharging into receiver 3. By maintaining sufficiently high temperature, the water will be kept separate from the ammonia vapor in this receiver, the water passing downwards while the ammonia vapor will continue through pipe 8 to first absorber 9. The vapor is cooled during the passage through pipe 8 by air or water as desired.

The water is cooled in cooler 4, passing through coil 5 enclosed in said cooler. From this cooler, the water continues in two directions; through pipe 6 to second absorber 14, and through pipe 7 to first absorber 9. The flow is created by the raising of the water level in receiver 3.

In the absorber 9, the downflowing water meets the upflowing ammonia vapor and absorbs same, forming a rich solution at the lower part of this absorber. Baffle plates 9a will assist to break up the water into a fine spray and the cooling water in cooling jacket 10 will remove the heat generated, this cooling water entering through 10a and discharging through 10b.

The rich solution formed in absorber 9 passes through pipe 11 into evaporator 12. This evaporator is fitted with baffle plates 12a to assist in breaking up the down-flowing rich solution.

The second absorber 14 is surrounded by jacket 15, allowing for cooling by water, the cooling water entering at 15a and discharging at 15b. Absorber 14 is also fitted with baffles 14a to break up the down-flowing water entering through pipe 6.

The rich solution entering evaporator through pipe 11 from first absorber 9 will create a certain ammonia vapor pressure, the ammonia vapor filling evaporator 12, connection 13 and second absorber 14. This vapor pressure will be a function of temperature and concentration of solution coming from absorber 9.

Now, when water enters through pipe 6 into the space filled with ammonia vapor, an absorption will take place, and with this absorption a lowering of the ammonia vapor pressure. With this lowering of ammonia vapor pressure, further evaporation of ammonia from the rich solution coming from absorber 9 will occur, as this solution falls downwards into evaporator. The solution reaching the lower end of the evaporator will be changed to a weak solution, this change taking place gradually as the liquid passes downwards.

In the absorber, an opposite effect takes place, in that the water entering through pipe 6 will gradually increase in concentration, so that the liquid in the lower end of same absorber will be rich solution.

The absorption will generate heat and the evaporation will absorb heat, the amount generated being equal to the amount absorbed. By removing the heat generated in absorber 14, the evaporator 12 will act as a refrigerating element, it being understood that refrigeration means removal of heat to a temperature below that of the available cooling water or air and not necessarily the reduction of the temperature to a point of freezing a liquid to a solid form.

The rich solution from absorber 14 passes through pipe 16 and mixes with weak solution from evaporator 12 passing through pipe 17, the mixture passing through pipe 18 back to generator 1.

In Fig. 2 and the above description, I show and describe application of heat to the generator 1 by a flame 1a, and I have also mentioned that the heating means may be devised in many ways.

I may arrange the apparatus and employ certain mediums where the heat necessary for vaporization in a generator is sufficiently low so that the heat may be applied at ordinary room temperature. The only other requirement now will be that the temperature of the cooling water shall be lower than the room temperature so that heat units may be removed by this water. The actual heat absorbed by any ordinary refrigeration method is the heat absorbed by the cooling water in a conventional condenser. No matter what heat is given the medium in a compressor or in a generator, it is the heat removed by the cooling medium which later is realized by absorption of heat in an evaporator.

It is therefore not contrary to known laws and practice to devise a refrigeration machine where no compressor is used nor any heat applied by such means as a flame, electric current, or steam, but where the entire reliance is laid upon removal of heat in a condenser or in an absorber by the cooling medium.

I may use in my apparatus sulphur dioxide and ether. I may use pressures to allow vaporization in the generator.

In Fig. 3 I illustrate in diagrammatic form a modification of my apparatus. Similar notations in Fig. 3 refer to similar parts as shown in Fig. 2.

In modification, Fig. 3, I heat the medium sufficiently high to vaporize not only the gaseous medium but also part of the liquid medium. Space above liquid in 3 is therefore a mixture of vapors which may be assumed to be ammonia and water vapors. In cooling this mixture in absorber 9, the condensed water will absorb ammonia vapors, forming a very highly concentrated solution, which then issues in 12 through perforated funnel 12b.

In this case I do not need water injection in 9 and have therefore eliminated connection 7. Water entering through funnel 14b in 14 will be practically pure water, the temperature being maintained in 3 to keep the ammonia out of the liquid. There is thus an ideal condition for heat transfer with a very highly concentrated solution entering into 12 and nearly pure water entering into 14.

Having thus described my invention, what I claim as new and desire to secure by Letters Patent is:

1. A process of refrigeration consisting of, by the application of heat, separating a gas in solution with a liquid from said liquid; reabsorbing the separated gas into part of the liquid, forming a highly concentrated solution; introducing said concentrated solution into a space and introducing the balance of the liquid into another space in communication with the first-mentioned space, the introduction of the liquid in the said second space by the absorption of the said gas contained therein creating a reduction of pressure sufficient to cause separation of said gas from said concentrated solution in said first space.

2. That improvement in the art of refrigeration employing a solution of a gas in a liquid as medium, by the application of heat vaporizing part of said solution forming a mixture of vapors on one hand and a weakened solution on the other hand, changing said mixture of vapors into a highly concentrated solution by condensation and reabsorption, then bringing said highly concentrated solution into the presence of the weakened solution in such a manner as to cause evaporation of the absorbed gas out of the highly concentrated solution and absorption of said evaporated gas into said weakened solution with accompanied absorption and generation of heat.

3. In a refrigerating apparatus, a closed and sealed circulating system containing a refrigerating medium consisting of a solution of a gas in a liquid, said apparatus including a generator adapted to be heated whereby, first, said gas is separated from the liquid; second, a portion of said liquid is vaporized, a condenser for condensing said vapor and reabsorbing said gas forming a rich solution, a cooler for reducing the temperature of the balance of said liquid remaining in said generator, an evaporator to receive said rich solution and an absorber to receive said liquid after cooling, said evaporator and said absorber being in comunication in such a manner as to permit vapors evaporated from the rich solution in said evaporator to be absorbed in the liquid in said absorber forming a weakened solution in the former and a strengthened solution in the latter, and means to bring the said solutions back to said generator.

4. A method of refrigeration, by the application of heat vaporizing a gas from a solution of said gas in a liquid forming a weakened solution, absorbing said gas into part of said weakened solution forming a rich solution, injecting said remaining weakened solution into a space in communication with another space into which other space said rich solution is injected, thus causing evaporation of the absorbed gas and absorption of the evaporated gas in an endeavor to equalize the concentrations and form equilibrium between the two interconnected spaces.

5. In a method of refrigeration utilizing solutions of gases in liquids as mediums, by the application of heat separating the gas from the solution and vaporizing part of the liquid forming a mixture of gas and vapor, then condensing said vapor and reabsorbing said gas in said condensate forming a highly concentrated solution.

6. A method of refrigeration, forming a maximum concentrated solution of a gas in a liquid by condensing vapors of the liquid in the presence of the said gas in predetermined volume proportions, then separating said absorbed gas from said solutions by bringing same in contact with a similar but less concentrated solution.

7. In a refrigerating apparatus, a boiler and heating means in connection with said boiler said heating means causing vaporization of a part of a solution of a gas in a liquid forming a mixture of gas and vapor, a condenser and communication means between said condenser and said boiler, said condenser causing condensation of said vapor and absorption of said gas into said condensate forming a rich solution, an evaporating chamber and an absorption chamber, communication means between said evaporating chamber and said absorption chamber, means to transfer said rich solution from said condenser to said evaporating chamber and means to transfer the balance of the solution from said boiler to said absorption chamber and further means to transfer solutions from said evaporating chamber and said absorption chamber back to said boiler.

In testimony whereof, I have hereunto set my hand at San Diego, California, this 24th day of March, 1930.

BO FOLKE RANDEL.